US008087489B2

(12) United States Patent
Tanaka et al.

(10) Patent No.: US 8,087,489 B2
(45) Date of Patent: Jan. 3, 2012

(54) ARTICULATED CONSTRUCTION VEHICLE INCLUDING A LEVER-OPERATED ELECTRICAL CONTROL DEVICE

(75) Inventors: Toshio Tanaka, Tsuchiura (JP); Tsuyoshi Nakamura, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 333 days.

(21) Appl. No.: 12/513,989

(22) PCT Filed: Nov. 7, 2007

(86) PCT No.: PCT/JP2007/071643
§ 371 (c)(1),
(2), (4) Date: May 7, 2009

(87) PCT Pub. No.: WO2008/056703
PCT Pub. Date: May 15, 2008

(65) Prior Publication Data
US 2010/0051376 A1    Mar. 4, 2010

(30) Foreign Application Priority Data

Nov. 8, 2006  (JP) ................................ 2006-302859

(51) Int. Cl.
*B62D 5/06* (2006.01)

(52) U.S. Cl. ......................... 180/422; 180/418; 180/442

(58) Field of Classification Search ................. 180/442, 180/418, 419, 422
See application file for complete search history.

(56) References Cited

U.S. PATENT DOCUMENTS 6,176,083 B1 * 1/2001 Ikari ............................... 60/422
6,408,977 B1   6/2002 Obertrifter et al.
6,438,950 B1 * 8/2002 Peistrup et al. ................. 60/385
7,610,989 B2 * 11/2009 Vigholm et al. ............... 180/418
2010/0228439 A1 * 9/2010 Nakamura et al. .............. 701/41

FOREIGN PATENT DOCUMENTS

JP        08175219 A  *  7/1996
JP        10-44948 A      2/1998
(Continued)

OTHER PUBLICATIONS

International Search Report dated Feb. 26, 2008 w/English translation (three (3) pages).

*Primary Examiner* — Joanne Silbermann
*Assistant Examiner* — Daniel Yeagley
(74) *Attorney, Agent, or Firm* — Crowell & Moring LLP

(57) ABSTRACT

An articulated construction vehicle is provided with an articulated, self-propelled body, body-articulating hydraulic cylinders for articulating the self-propelled body, a pilot-operated directional control valve for controlling a flow of pressure oil to the body-articulating hydraulic cylinders, and a steering-wheel-operated control device for outputting a pilot signal to corresponding one of signal-receiving ports of a directional control valve by rotational operation of a steering wheel. The articulated construction vehicle includes a lever-operated, electrical control device for outputting an electrical signal by tilt operation of a lever, a controller for receiving the electrical signal from the control device to output an electrical signal concerning the operation of the lever, a signal converter for converting the electrical signal into a pilot signal and outputting the pilot signal to a corresponding signal-receiving port of the directional control valve to switch the control valve, and a selector of an operation system.

4 Claims, 1 Drawing Sheet

FOREIGN PATENT DOCUMENTS

| | | | |
|---|---|---|---|
| JP | 10045014 A | * | 2/1998 |
| JP | 10-230863 A | | 9/1998 |
| JP | 2919051 B2 | | 4/1999 |
| JP | 2002-512922 A | | 5/2002 |
| JP | 2005297924 A | * | 10/2005 |
| JP | 2005-538883 A | | 12/2005 |
| WO | WO 2004/024537 A1 | | 3/2004 |

* cited by examiner

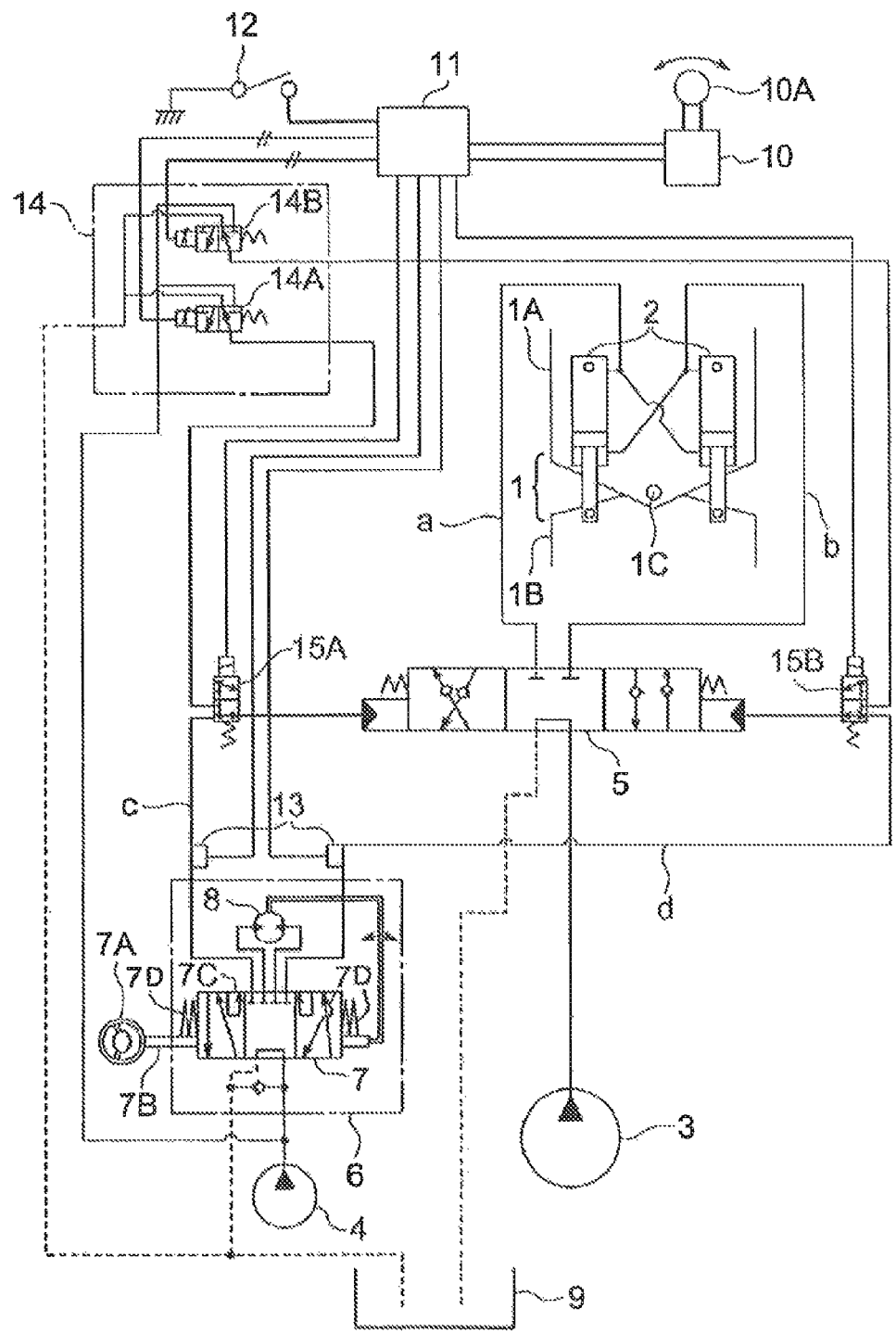

ARTICULATED CONSTRUCTION VEHICLE INCLUDING A LEVER-OPERATED ELECTRICAL CONTROL DEVICE

BACKGROUND OF THE INVENTION

1. Field of the Invention

The invention of the present application relates to an articulated construction vehicle such as a wheel loader or self-propelled compacting machine, which is provided with a self-propelled body with a front frame and a rear frame connected together rotatably relative to one another in a horizontal direction such that the self-propelled body can be articulated and is also provided with body-articulating hydraulic cylinders as hydraulic actuators for articulating the self-propelled body.

2. Description of the Related Art

Self-propelled construction vehicles include special-purpose vehicles that as unseen in general construction vehicles, their self-propelled bodies are articulated to make them go in a curve upon making them turn. Such construction vehicles will be called "articulated construction vehicles" herein, and as representative examples, articulated wheel loaders can be mentioned. In such an articulated construction vehicle, a self-propelled body is divided into a front frame supported by front wheels and a rear frame supported by rear wheels, and both the frames are connected rotatably relative to one another in a horizontal direction such that the self-propelled body can be articulated. Also provided as hydraulic actuators for articulating the self-propelled body are body-articulating hydraulic cylinders selectively extendable or retractable such that the front frame can be driven to rotate relative to the rear frame in the horizontal direction.

In addition to the body-articulating hydraulic cylinders, the articulated construction vehicle is also provided with a pilot-operated directional control valve and a control device to construct a steering device. The pilot-operated directional control valve controls a direction and amount of pressure oil to be fed to each of these pilot-operated directional control valves, and by operator's operation, the control device outputs a pilot signal to the corresponding one of signal-receiving ports of the pilot-operated directional control valve to switch an operated position and opening area of the directional control valve. Roughly dividing such hydraulic steering devices depending on their operation means through which operators operate the steering devices, there are the wheel-type that each steering device is provided with a steering wheel to be rotationally operated and the lever type that each steering device is provided with a lever to be tilt(pivot)-operated.

It obviously becomes necessary to make the articulated construction vehicle travel when performing work, for example, when performing digging work or loading work of excavated earth and/or sand on a truck by a wheel loader at a construction site. Because such a wheel loader can travel at 35 km or so per hour, it would be convenient if the wheel loader can be designed to permit traveling to go and come on general roadways in addition to traveling to perform such work. In fact, an articulated construction vehicle is allowed under regulations to travel on general roadways. When traveling on general roadways, however, it is required under regulations to operate a steering system through a steering wheel. For this reason, wheel-type steering systems have heretofore been generally adopted for articulated construction vehicles.

A wheel-type, vehicle steering system provided with hydraulic cylinders as hydraulic actuators for steering as mentioned above is disclosed, for example, in Patent Document JP-B-2919051. Considering the features of such a wheel-type, vehicle steering system, operation of a steering wheel is rotational operation as opposed to tilt operation of a lever, and the steering wheel is extremely large in the amount of maximum operation compared with the lever. This steering system can, therefore, perform fine operation. Concerning the operation of a steering system, traveling on a general roadway requires to frequently perform fine operation such as making the vehicle turn subtly although it is unnecessary to frequently perform such operation as making the vehicle go in a large curve. An articulated construction vehicle provided with a wheel-type steering system is hence suited for traveling on general roadways. The articulated construction vehicle provided with such a wheel-type steering system can be driven or operated with the same maneuvering feeling as general cars, and in this respect, is also suited for traveling on general roadways. See Patent Document JP-B-2919051 (pages 1-3, FIGS. 1-2).

An articulated construction vehicle with a wheel-type steering system adopted in Patent Document JP-B-2919051 is suited for traveling on general roadways as described above, but is not fully suited for work at construction sites. An explanation will be made about its reasons. Firstly, it is necessary to frequently perform large operation to make the vehicle body go in a curve when performing work at a construction site. As mentioned above, operation of a steering wheel is extremely large in the amount of maximum operation compared with operation of a lever. When digging work is performed by a wheel loader at a narrow working site, for example, it often becomes necessary to make the vehicle body go in a curve leftwards and rightwards to maximum extent. In such a case, the steering wheel has to be rotated counterclockwise four full turns or clockwise two full turns. With the articulated construction vehicle with the steering system of this type, large operation which requires a large operation amount as described above is frequently performed so that an operation-related considerable load is applied to an operator to cause operator fatigue.

Secondly, a steering wheel is suited for its operation while being held with both hands. However, when traveling while performing work as in the case of performing digging work by a wheel loader, one or more hydraulic actuators relating to the work have to be also operated in addition to the body-articulating hydraulic cylinders. This unavoidably requires to operate the steering wheel with only one hand, so that the operation is awkward. Further, such working hydraulic actuators are generally operated by control means such as levers, and therefore, are manually operated by the operation means which perform movements of different kind from that of the steering wheel. When traveling while performing work, it is therefore necessary to perform operation of different kind from that of the steering wheel, such as tilt-operation of a control means like a lever with one hand while rotationally operating the steering wheel with the other hand. This also makes the operation awkward. For these reasons, the articulated construction vehicle with the wheel-type steering system adopted therein is not considered to be suited for work at construction sites.

BRIEF SUMMARY OF THE INVENTION

The invention of the present application has been developed to solve such problems of the conventional technologies, and its technical problem is to provide an articulated construction vehicle permitting steering control not only suited for traveling on general roadways but also suited for work at construction sites.

The above-described technical object is achieved by a first embodiment of the present invention, which is described below. In an articulated construction vehicle provided with a self-propelled body with a front frame and a rear frame connected together rotatably relative to one another in a horizontal direction such that the self-propelled body can be articulated, body-articulating hydraulic cylinders selectively extendable or retractable such that the front frame can be driven to rotate relative to the rear frame in the horizontal direction to articulate the self-propelled body, a pilot-operated directional control valve for controlling a direction and amount of pressure oil to be fed to each of the body-articulating hydraulic cylinders, and a steering-wheel-operated control device provided with a rotationally-operable steering wheel such that by a rotational operation of the steering wheel, a pilot signal can be outputted to corresponding one of signal-receiving ports of the pilot-operated directional control valve to switch an operated position and opening area of the pilot-operated directional control valve.

The articulated construction vehicle is constructed by being provided with a lever-operated, electrical control device provided with a tilt-operable lever to output an electrical signal by tilt-operation of the lever, a controller for being inputted with the electrical signal from the lever-operated, electrical control device to output an electrical signal concerning a direction and amount of the operation of the lever, a signal conversion means for converting the electrical signal from the controller into a corresponding pilot signal and outputting the pilot signal to corresponding one of the signal-receiving ports of the pilot-operated directional control valve, and a selection means of an operation system that operation of the pilot-operated directional control valve by the rotational operation of the steering wheel in the steering-wheel-operated control device and operation of the pilot-operated directional control valve by the tilt-operation of the lever in the lever-operated, electrical control device can be selectively performed.

A description will next be made about advantages of the articulated construction vehicle according to the first embodiment of the present invention, which is constructed as described above. As this articulated construction vehicle is provided with the steering-wheel-operated control device which is in turn provided with the rotationally-operable steering wheel, the articulated construction vehicle is conveniently allowed under regulations to travel going and coming on general roadways. Further, the steering-wheel-operated control device is operated by rotational operation and the amount of maximum operation is extremely large. Accordingly, the steering-wheel-operated control device makes it possible to easily perform fine operation which needs to be frequently performed during traveling on a general roadway, and also makes it possible to perform driving operation with similar maneuvering feeling as general cars. The articulated construction vehicle is, therefore, suited for traveling on general roadways while retaining the excellent performance of the conventional articulated construction vehicles as they are.

In addition to the equipment of such excellent performance of the conventional technologies as they are, the articulated construction vehicle according to the present invention is also provided with the lever-operated, electrical control device that is provided with the tilt-operable lever and outputs an electrical signal by the tilt operation, and is designed to permit selective performance of operation by the lever-operated, electrical control device through "the selection means of the operation system". Different from the conventional technologies, the articulated construction vehicle according to the present invention is also suited for work at construction sites.

Described specifically, the operation of the lever in the lever-operated, electrical control device is tilt operation that causes the lever to tilt by bending or extending the wrist while holding the lever with one hand. The amount of maximum operation is extremely small compared with that of operation of the steering wheel. Even if it becomes necessary during work at a construction site to frequently perform large operation the amount of which is large, the operation-related load applied to an operator is far smaller compared with that applied by operation of the steering wheel.

The lever is suited for operation by holding it with one hand. When traveling is performed at a construction site while performing work there as in the case of performing digging work by a wheel loader, a control means for one or more hydraulic actuators relating to the work can, therefore, be easily operated with one hand while operating the lever-operated, electrical control device with the other hand. At this time, the operation of the body-articulating hydraulic cylinders is performed under control by the lever as in the operation commonly performed in the operation of the one or more hydraulic actuators for the work. Therefore, the operation of both the hydraulic actuators can be performed by operation means of the same kind, and hence, can be performed with ease. The operation by the lever is operation by the electrical lever, which can reduce operating force at the time of operation. The operation at the time of work can, therefore, be facilitated further. As is readily appreciated from the above description, the articulated construction vehicle according to the present invention can perform steering control, which is not only suited for traveling on general roadways but also suited for work at construction sites.

A second embodiment of the present invention that achieves the above-described technical object is described below.

In an articulated construction vehicle provided with a self-propelled body with a front frame and a rear frame connected together rotatably relative to one another in a horizontal direction such that the self-propelled body can be articulated, body-articulating hydraulic cylinders selectively extendable or retractable such that the front frame can be driven to rotate relative to the rear frame in the horizontal direction to articulate the self-propelled body, a hydraulic pump for producing pressure oil to drive the body-articulating hydraulic cylinders, a pilot-operated directional control valve arranged on a delivery side of the hydraulic pump to control a direction and amount of the pressure oil to be fed to each of the body-articulating hydraulic cylinders, a pilot pump arranged in a system different from a flow line for the pressure oil from the hydraulic pump to produce a pilot pressure for switching the pilot-operated directional control valve, and a steering-wheel-operated control device having a rotary directional control valve arranged on a delivery side of the pilot pump and provided with a steering wheel rotationally operable to operate the body-articulating hydraulic cylinders, said steering-wheel-operated control device being capable of acting, upon rotational operation thereof, to guide pilot oil in an amount corresponding to an amount of the operation of the steering wheel from the pilot pump to one of paired signal-receiving ports of the pilot-operated directional pump such that an operated position and opening area of the pilot-operated directional control valve can be switched in accordance with a direction and the amount of the operation of the steering wheel, respectively, and during non-operation of the steering wheel, to cut off a flow of the pilot oil guided to the paired signal-receiving ports of the pilot-operated directional control valve.

The articulated construction vehicle is constructed by being provided with a lever-operated, electrical control device arranged in a system different from the steering-wheel-operated control device and provided with a tilt-operable lever to output an electrical signal by tilt-operation of the lever, a controller for being inputted with the electrical signal from the lever-operated, electrical control device to output an electrical signal concerning a direction and amount of the operation of the lever, a pair of pressure-proportional solenoid valves for being switched by an electrical signal from the controller to guide pilot oil in an amount corresponding to the electrical signal to one of the paired signal-receiving ports of the pilot-operated directional control valve and also to communicate the other signal-receiving port to a side of an oil reservoir such that the operated position and opening area of the pilot-operated directional control valve can be switched, a pair of solenoid-operated selector valves switchable by an electrical signal to open one of a pilot line, which is to communicate the paired pressure-proportional solenoid valves to the respective signal-receiving ports of the pilot-operated directional control valve, and another pilot line, which is to communicate the steering-wheel-operated control device to the respective signal-receiving ports of the pilot-operated directional control valve, and to close the other pilot line, and a lever-type electrical change-over switch for switching the pair of solenoid-operated selector valves by an electrical signal such that the pilot line, which is to communicate the pair of pressure-proportional solenoid valves to the respective signal-receiving ports of the pilot-operated directional control valve, is opened to bring the lever-operated, electrical control device into an usable state.

The articulated construction vehicle according to the second embodiment of the present invention constructed as described above manifests a preferred embodiment upon practicing the above-described articulated construction vehicle according to the first embodiment, and obviously, exhibits similar advantages as the articulated construction vehicle according to the first embodiment. By the articulated construction vehicle according to the present invention, it is also possible to achieve the technical object of the present application that is "to permit performing steering control, which is not only suited for traveling on general roadways but also suited for work at construction sites".

Incidentally, during non-operation of the steering wheel in the steering-wheel-operated control device, a flow of pilot oil guided to the pair of single-receiving ports of the pilot-operated directional control valve is cut off. During non-use of the steering-wheel-operated control device, the guidance of pilot oil to one of the pair of signal-receiving ports of the pilot-operated directional control valve, therefore, makes it impossible to drain the pilot oil from the other signal-receiving port. If nothing is done, the pilot-operated directional control valve cannot be switched without any problem by the lever-operated, electrical control device. The articulated construction vehicle according to the second embodiment has been worked out with a view to solving this problem.

Especially as described above, the pair of pressure-proportional solenoid valves and the pair of solenoid-operated selector valves are arranged, and by an electrical signal from the lever-type electrical change-over switch, the paired solenoid-operated selector valves are switched such that the paired pressure-proportional solenoid valves are communicated to the respective signal-receiving ports of the pilot-operated directional control valve. It is, therefore, possible to guide the pilot oil to the corresponding one of the paired signal-receiving ports of the pilot-operated directional control valve by associated one of the paired pressure-proportional solenoid valves and also to drain the pilot oil from the other signal-receiving port to the side of the oil reservoir by the other pressure-proportional solenoid valve. The pilot-operated directional control valve can, therefore, be switched without any problem by the lever-operated, electrical control device.

As will become evident from the following description, the articulated construction vehicles according to the first embodiment and second embodiment of the present invention are both constructed as described above. Accordingly, each of these articulated construction vehicles can perform steering control not only suited for traveling on general roadways but also suited for work at construction sites. As a consequence, each of these articulated construction vehicles can reduce an operational load on its operator to decrease the operator's fatigue compared with the conventional articulated construction vehicles upon performing steering control of the construction vehicle. Especially according to the articulated construction vehicle of the second embodiment, the articulated construction vehicle of the first embodiment can be practiced in the desired embodiment, thereby making it possible to practice such that the pilot-operated directional control valve can be switched without any problem by the lever-operated, electrical control device.

If the articulated construction vehicle according to the first embodiment of the present invention is practiced according to an exemplary embodiment of the present invention, a high degree of reliability can be assured for steering control by giving priority to operation through the steering-wheel-operated control device, which is high in the reliability of steering control, to prevent tilt operation of the lever from functioning in the lever-operated, electrical control device when it is determined at the controller that a pilot signal is outputted from the steering-wheel-operated control device, in other words, when the steering-wheel-operated control device having the high degree of reliability in steering control is operated.

If the articulated construction vehicle according to the first embodiment of the present invention is practiced according to an exemplary embodiment of the present invention, the rotary spool returns to a neutral position by itself when pilot oil is guided to the signal-receiving port of the pilot-operated directional control valve in a predetermined amount corresponding to the amount of rotation of the steering wheel. The articulated construction vehicle, therefore, does not require a trouble which is otherwise needed to have the rotary spool returned to the neutral position by steering operation. The load of steering operation at the steering-wheel-operated control device which is high in operational load can hence be reduced, thereby contributing to a reduction in the operator's fatigue caused by the steering operation.

BRIEF DESCRIPTION OF THE DRAWING

The sole drawing in this application illustrates a hydraulic circuit diagram of a steering system adopted in an articulated construction vehicle according to the invention of the present application.

DETAILED DESCRIPTION OF THE DRAWING

Desired embodiments for carrying out the invention of the present application will hereinafter be described with reference to the drawing.

The drawing is a hydraulic circuit diagram of a steering system adopted in an articulated construction vehicle constructed by practicing the invention of the present application. A description will hereinafter be made of the articulated construction vehicle according to the invention of the present application, in which the description will be made by taking as examples cases in which the present invention is practiced in an articulated wheel loader.

Referring to the drawing, a description will firstly be made of general technical details about the articulated wheel loader for practicing the present invention by providing a steering system.

Depicted are a self-propelled body 1 in the wheel loader as an articulated construction vehicle which travels by wheels; a front frame 1A as a front body which is supported by front wheels and constitutes a front section of the self-propelled body 1; a rear frame 1B as a rear body which is supported by rear wheels and constitutes a rear section of the self-propelled body 1; a pin 1C connecting the front frame 1A to the rear frame 1B rotatably relative to one another in a horizontal direction; and body-articulating hydraulic cylinders 2 selectively extendable or retractable as steering hydraulic cylinders to drive such that the front frame 1A can be drive to rotate relative to the rear frame 1B in the horizontal direction about the pin 1C to articulate the self-propelled body 1.

The articulated wheel loader is provided on the front frame 1A thereof with an unillustrated work implement which can perform various work such as earth and/or sand digging work, loading work and snow ploughing work. Further, an unillustrated operator's seat is mounted on the rear frame 1B such that an operator can maneuver the work implement and the self-propelled body 1. This articulated wheel loader is constructed such that the operator can perform work at a construction site or can travel going or coming on a roadway by extending or retracting the body-articulating hydraulic cylinders 2 to rotate the front frame 1A relative to the rear frame 1B.

The work implement is equipped with a lift arm supported on a front part of the front frame 1A and mounted pivotally up and down about the support point; a bucket mounted pivotally in an up-and-down direction on a front end part of the lift arm; a lift arm cylinder extendable or retractable as a hydraulic actuator to drive the lift arm such that the lift arm is raised or lowered; and a bucket cylinder extendable or retractable as a hydraulic cylinder to drive the bucket such that the bucket can be pivoted in the up-and-down direction. With this wheel loader, various work may be performed by controlling the steering, body-articulating hydraulic cylinders 2 by an operation means in association with the hydraulic actuators for the work implement as needed. In digging work of earth and/or sand or snow ploughing work, for example, operation of the hydraulic actuators for the work implement and operation of the body-articulating hydraulic cylinders 2 may be performed in association with each other when the bucket and lift arm are driven to perform digging or snow ploughing while driving the bucket into earth and/or sand or snow under advancing force at the time of traveling or when performing loading work in the course of the digging or snow ploughing work.

Based on the drawing, a description will now be made centering around the hydraulic circuit for the steering system in the articulated construction vehicle constructed by practicing the invention of the present application.

The drawing shows a hydraulic pump 3 drivable by an engine (not shown) to produce a hydraulic pressure to drive the body-articulating hydraulic cylinders 2; a pilot pump 4 arranged, in a system different from a flow line for pressure oil from the hydraulic pump 3, as a hydraulic pilot pressure production source for producing a hydraulic pilot pressure; a pilot-operated directional control valve 5 arranged on the delivery side of the hydraulic pump 3 for changing the direction and flow rate of pressure oil, which is to be fed from the hydraulic pump 3 to the body-articulating hydraulic cylinders 2, to control the operation of the cylinders 2; a first pressure-oil feed and drain line a for connecting the left-side output port of the pilot-operated directional control valve 5 to the bottom side of the left-side body-articulating hydraulic cylinder 2 and the rod side of the right-side body-articulating hydraulic cylinder 2; a second pressure-oil feed and drain line b for connecting the right-side output port of the pilot-operated directional control valve 5 to the rod side of the left-side body-articulating hydraulic cylinder 2 and the bottom side of the right-side body-articulating hydraulic cylinder 2.

Depending on the direction of rotational operation of a steering wheel 7A to be mentioned subsequently herein, a hydraulic pilot pressure is fed from the pilot pump 4 to the corresponding one of the left and right, signal-receiving ports of the pilot-operated directional control valve 5 to switch it from the neutral position to the corresponding one of the left and right positions. When switched to the left position, the pilot-operated directional control valve 5 feeds the pressure oil from the hydraulic pump 3 to the bottom side of the left-side, body-articulating hydraulic cylinder 2 through the first pressure-oil feed and drain line a, and further, drains the pressure oil from the rod side of the left-side, body-articulating hydraulic cylinder 2 to an oil reservoir 9 through the second pressure-oil feed and drain line b. As a consequence, the left-side body-articulating hydraulic cylinder 2 is extended. In parallel with these operation, the pilot-operated directional control valve 5 feeds the pressure oil from the hydraulic pump 3 to the rod side of the right-side, body-articulating hydraulic cylinder 2 through the first pressure-oil feed and drain line a, and further, drains the pressure oil from the bottom side of the right-side, body-articulating hydraulic cylinder 2 to the oil reservoir 9 through the second pressure-oil feed and drain line b. As a consequence, the right-side body-articulating hydraulic cylinder 2 is retracted. As a result, the front frame 1A is rotated in a rightward direction relative to the rear frame 1B.

When the pilot-operated directional control valve 5 is switched to the right position, on the other hand, the pilot-operated directional control valve 5 feeds the pressure oil from the hydraulic pump 3 to the rod side of the left-side, body-articulating hydraulic cylinder 2 through the second pressure-oil feed and drain line b, and further, drains the pressure oil from the bottom side of the left-side, body-articulating hydraulic cylinder 2 to the oil reservoir 9 through the first pressure-oil feed and drain line a. As a consequence, the left-side body-articulating hydraulic cylinder 2 is retracted. At the same time, the pilot-operated directional control valve 5 feeds the pressure oil from the hydraulic pump 3 to the bottom side of the right-side, body-articulating hydraulic cylinder 2 through the second pressure-oil feed and drain line b, and further, drains the pressure oil from the rod side of the right-side, body-articulating hydraulic cylinder 2 to the oil reservoir 9 through the first pressure-oil feed and drain line a. As a consequence, the right-side body-articulating hydraulic cylinder 2 is extended. As a result, the front frame 1A is rotated in a leftward direction relative to the rear frame 1B. In the above-described switching operation of the pilot-operated directional control valve 5 by the rotational operation of the steering wheel 7A, the extending or retracting speed of each body-articulating hydraulic cylinder 2 can be controlled by adjusting the opening area in accordance with the amount of operation of the steering wheel 7A.

Also illustrated are a steering-wheel-operated control device 6 that by rotational operation of the steering wheel 7A, outputs a hydraulic pilot pressure to the corresponding one of the left and right, signal-receiving ports of the pilot-operated directional control valve 5 to switch the operated position (the left position or right position switched from the neutral position) and the opening area (the cross-sectional area of a flow passage for the pilot oil) of the pilot-operated directional control valve 5; a rotary directional control valve 7 arranged on the delivery side of the pilot pump 4 such that by rotational operation of the steering wheel 7A attached to a spool 7B, a hydraulic pilot pressure is outputted to the corresponding one of the left and right, signal-receiving ports of the pilot-operated directional control valve 5 to switch the pilot-operated directional control valve 5 from the neutral position to the right position or left position; a gear pump 8 rotatable in two directions, normal and reverse, in synchronization with rotation of the spool 7B of the rotary directional control valve 7; the oil reservoir 9 for retaining hydraulic oil and pilot oil therein; a left pilot line c for guiding pilot oil to the left signal-receiving port of the pilot-operated directional control valve 5; and a right pilot line d for guiding pilot oil to the right signal-receiving port of the pilot-operated directional control valve 5.

In the embodiment depicted in the drawing, the steering-wheel-operated control device 6 is constructed by providing the rotary directional control valve 7 and gear pump 8. The rotary directional control valve 7 is constructed by providing a valve main body 7C having a snug-fit bore formed therein, the rotary spool 7B rotatably fitted in the snug-fit bore of the valve main body 7C for rotation by rotational operation of the steering wheel 7A, and springs 7D for holding the rotary spool 7B at the neutral position. By rotating the rotary spool 7B, plural ports arranged in the valve main body 7C are opened or closed by the rotary spool 7B to switch the flow direction and flow rate of the pilot oil. For the sake of convenience in description, the drawing shows this rotary-spool-type directional control valve 7 as if it is a slide-spool-type directional control valve with the rotary spool 7B linearly slidable from the neutral position to the left or right position within the valve main body 7C. A description on this rotary directional control valve 7 will hereinafter be made based on the directional control valve 7 shown in the drawing.

When the steering wheel 7A is rotationally operated either counterclockwise or clockwise, the flow passage of the rotary directional control valve 7 is switched from the neutral position depending on the direction of the rotational operation. When rotationally operated counterclockwise, the rotary directional control valve 7 is brought into a state equivalent to the state of the directional control valve 7 of the drawing as switched to the left position, so that the flow passage which is in communication with the pilot pump 4 is connected to the suction side of the gear pump 8 at the time of counterclockwise rotation, the delivery side of the gear pump 8 at the time of counterclockwise rotation is connected to the right pilot line d, and the left pilot line c is connected to the flow line which communicates to the oil reservoir 9.

When rotationally operated clockwise, the rotary directional control valve 7 is brought into a state equivalent to the state of the directional control valve 7 of the drawing as switched to the right position, so that the flow passage which is in communication with the pilot pump 4 is connected to the suction side of the gear pump 8 at the time of clockwise rotation, the delivery side of the gear pump 8 at the time of clockwise rotation is connected to the left pilot line c, and the right pilot line d is connected to the flow line which is in communication with the oil reservoir 9. In the above-described switching operation of the pilot-operated directional control valve 5 by the rotational operation of the steering wheel 7A, the hydraulic pilot pressure can be controlled by adjusting the opening area of the flow passage of the directional control valve 7 in accordance with the amount of operation of the steering wheel 7A.

The gear pump 8 is connected such that its rotary shaft becomes coaxial with the rotary spool 7B and, when the rotary spool 7B is rotated by rotational operation of the steering wheel 7A, the rotary shaft of the gear pump 8 is also correspondingly rotated in synchronization with the rotation of the rotary spool 7B. When the rotary directional control valve 7 is switched from the neutral position by either clockwise or counterclockwise rotational operation of the steering wheel 7A, the gear pump 8 is, therefore, also manually and rotationally driven in association with the rotational operation of the steering wheel 7A. As a result, the pilot oil from the pilot pump 4 is guided in an amount corresponding to the amount of the rotational operation of the steering wheel 7A to the corresponding one of the left and right pilot lines c,d through the flow passage of the rotary directional control valve 7.

Upon completion of the rotational operation of the steering wheel 7A, the rotary spool 7B is rotated by the resilient force of the spring 7D in a direction opposite to the direction of the rotational operation of the steering wheel 7A so that the rotary spool 7B is caused to return to the neutral position. At this time, the gear pump 8 which is coaxial with the rotary spool 8 also rotates in the opposite direction. In the course of these operation, the steering-wheel-operated control device 6 composed of the rotary directional control valve 7 and the gear pump 8 guides the pilot oil in a predetermined volume, which corresponds to the amount of rotation of the rotary spool 7b, as a pilot signal to the corresponding one of the signal-receiving ports of the pilot-operated directional control valve 5 through the gear pump 8. As a consequence, the opening area of the pilot-operated directional control valve 5 can be adjusted.

As the steering-wheel-operated control device 6 of the drawing is equipped with such a mechanism as described above, the rotary spool 7B returns to the neutral position by itself when the pilot oil in a predetermined amount corresponding to the amount of rotational operation of the steering wheel 7A is guided to the corresponding one of the signal-receiving ports of the pilot-operated directional control valve 5. The steering-wheel-operated control device 6, therefore, does not require such a trouble that the operator is supposed to perform rotational operation of the steering wheel 7 in the opposite direction to have the rotary spool 7b returned to the neutral position whenever the steering wheel 7A is rotationally operated. According to this steering-wheel-operated control device 6, the load of steering operation at the steering-wheel-operated control device which is high in operational load can hence be reduced, thereby contributing to a reduction in the operator's fatigue caused by the steering operation.

The description has been made above, centering around the hydraulic circuit relating to the steering system associated with the steering-wheel-operated control device 6. A description will next be made about a hydraulic circuit relating to a steering system associated with a lever-operated, electrical control device 10.

Depicted are the lever-operated, electrical control device 10 provided with a tilt-operable lever 10A to output an electrical signal by tilt operation of the lever 10A; a controller 11 for being inputted with the electrical signal from the lever-operated, electrical control device 10 to output an electrical signal concerning the direction and amount of the operation of the lever 10A; a lever-type electrical change-over switch 12 of an operation system that, when closed or opened, can selectively perform as a selection means either operation of the pilot-operated directional control valve 5 by rotational operation of the steering wheel 7A or operation of the pilot-operated directional control valve 5 by tilt operation of the lever 10A; and pressure sensors 13 arranged in the left and right pilot lines c,d, respectively, to detect the existence or non-existence of a pilot signal outputted from the steering-wheel-operated control device 6.

The lever-operated, electrical control device 10 is constructed such that, when the lever 10A is tilt-operated, an electrical signal concerning a voltage value to be outputted to the controller 11 changes in accordance with the direction and amount of the tilt operation. Inputted to the controller 11 are an ON/OFF signal indicating an ON/OFF state of the lever-type electrical change-over switch 12 and the results of detections at the pressure sensors 13. When the lever-type electrical change-over switch 12 is closed and an ON signal is inputted, the controller 11 outputs an electrical signal to the corresponding one of signal-receiving ports of solenoid-operated selector valves 15A,15B to be described subsequently herein such that the lever-operated, electrical control device 10 is brought into a usable state. When the operator next operates the lever 10A, the controller 11 generates an electrical signal corresponding to the direction and amount of the operation of the lever 10A and, as will be mentioned subsequently herein, outputs this electrical signal to the corresponding one of signal-receiving ports of a first pressure-proportional solenoid valve 14A or a second pressure-proportional solenoid valve 14B, so that switching operation of the pilot-operated directional control valve 5 is performed.

At the controller 11, on the other hand, a determination is made based on the detection results fed from the pressure sensors 13 as to whether or not a pilot signal has been outputted from the steering-wheel-operated control device 6. When the pilot signal is determined to have been outputted as a result of the determination, in other words, when the steering-wheel-operated control device 6 is determined to have been operated, the lever-operated, electrical control device 10 is brought into an unusable state. Described specifically, the steering-wheel-operated control device 6 is high in the reliability of steering control compared with the lever-operated, electrical control device 10, and therefore, by giving priority to this high-reliability control by the steering-wheel-operated control device 6 and disabling tilt operation of the lever 10A at the lever-operated, electrical control device 10, a high degree of reliability is assured for the steering control.

Illustrated are a signal conversion means 14 for converting an electrical signal from the controller 11 into a corresponding pilot signal to output the pilot signal to the corresponding one of the signal-receiving ports of the pilot-operated directional control valve 5 such that the operated position and opening area of the pilot-operated directional control valve 5 are switched; the first pressure-proportional solenoid valve 14A that can control the output value of the hydraulic pilot pressure to be guided from the flow line on the side of the pilot pump 4 to the secondary flow line by adjusting its opening area in accordance with the output value of an electrical signal from the controller 11; the second pressure-proportional solenoid valve 14B that can similarly control the output value of the hydraulic pilot pressure to be guided to the secondary flow line; the first solenoid-operated selector valve 15A switchable from the lower position to the upper position when the lever-type electrical change-over switch 12 is closed; and the second solenoid-operated selector valve 15B similarly switchable from the lower position to the upper position when the lever-type electrical change-over switch 12 is closed.

The signal conversion means 14 is constructed by providing the first pressure-proportional solenoid valve 14A and second pressure-proportional solenoid valve 14B. The first pressure-proportional solenoid valve 14A is actuated responsive to an electrical signal concerning the direction of operation of the lever 10A from the controller 11, and is switched from the right position to the left position. When switched to the left position, the first pressure-proportional solenoid valve 14A makes it possible to output a hydraulic pilot pressure from the pilot pump 4 to the left signal-receiving port of the pilot-operated directional control valve 5 through the first solenoid-operated selector valve 15A. Similarly, the second pressure-proportional solenoid valve 14B is switched from the right position to the left position responsive to an electrical signal concerning the direction of operation of the lever 10A and, when switched to the left position, makes it possible to output a hydraulic pilot pressure from the pilot pump 4 to the right signal-receiving port of the pilot-operated directional control valve 5 through the second solenoid-operated selector valve 15B.

In the course of these operation, the pressure-proportional solenoid valve 14A or 14B adjusts its opening area in accordance with the output value of an electrical signal from the controller 11, and hence, guides the pilot oil in an amount corresponding to the electrical signal to the corresponding one of the left and right, signal-receiving ports of the pilot-operated directional control valve 5 so that the hydraulic pilot pressure to be outputted to the signal-receiving port can be adjusted. It is to be noted that, when the pressure-proportional solenoid valves 14A,14B have been switched to the right positions, the left and right, signal-receiving ports of the pilot-operated directional control valve 5 are maintained in communication with the side of the oil reservoir 9.

The first solenoid-operated selector valve 15A and second solenoid-operated selector valve 15B are switched from the lower positions to the upper positions when an electrical signal is outputted from the controller 11 to their signal-receiving ports by closing operation of the lever-type electrical change-over switch 12. As a result, depending on the switched states of the pressure-proportional solenoid valves 14A,14B, pilot oil can be fed to one of the left and right, signal-receiving ports of the pilot-operated directional control valve 5, and the pilot oil can be drained from the other signal-receiving port to the oil reservoir 9. As a consequence, it becomes feasible to perform the switching operation of the pilot-operated directional control valve 5 by the lever-operated, electrical control device 10. It is to be noted that, when the solenoid-operated selector valves 15A,15B have been switched to the lower positions, the pilot lines c,d are maintained in communication with the signal-receiving ports of the pilot-operated directional control valve 5 to maintain the steering-wheel-operated control device 6 in a usable state.

This articulated construction vehicle is designed to permit selective use of the lever-operated, electrical control device 10 by adding the hydraulic circuit concerning the lever-operated, electrical control device 10 to the hydraulic circuit concerning the steering by the steering-wheel-operated control device 6. Incidentally, when the rotary directional control valve 7 is at the neutral position, the pilot lines c,d between the pilot-operated directional control valve 5 and the steering-wheel-operated control device 6 form a closed circuit, and therefore, cut off a flow of pilot oil guided to the left and right, signal-receiving ports of the pilot-operated directional control valve 5 at the time of non-operation of the steering wheel 7A. At the time of non-use of the steering-wheel-operated control device 6, the guidance of a hydraulic pilot pressure to one of the left and right, signal-receiving ports of the pilot-operated directional control valve 5, therefore, makes it impossible to drain a hydraulic pilot pressure from the other signal-receiving port. If nothing is done, the pilot-operated directional control valve 5 cannot be switched without any problem by the lever-operated, electrical control device 10.

The pressure-proportional solenoid valves 14A,14b and solenoid-operated selector valves 15A,15B are specifically arranged to overcome such a problem. This has made it possible to add the lever-type electrical change-over switch 10 with a simple structure and to selectively use it. Described specifically, the left and right, pressure-proportional solenoid valves 14A,14b and the left and right, solenoid-operated selector valves 15A,15B are arranged to switch the left and right, solenoid-operated selector valves 14A,14B by an electrical signal outputted by switching operation of the lever-type electrical change-over switch 12 such that the pressure-proportional solenoid valves 14A,14B are communicated to the left and right, signal-receiving ports of the pilot-operated directional control valve 5. It is, therefore, possible to guide the pilot oil to the corresponding one of the left and right, signal-receiving ports of the pilot-operated directional control valve 5 by the associated one of the left and right, pressure-proportional solenoid valves 14A,14B and also to drain the pilot oil from the other signal-receiving port to the side of the oil reservoir 9 by the other pressure-proportional solenoid valve. The pilot-operated directional control valve 5 can, therefore, be switched without any problem by the lever-operated, electrical control device 10.

A description will hereinafter be made about advantageous effects of the above-described articulated construction vehicle.

As this articulated construction vehicle is provided with the steering-wheel-operated control device 6 which is in turn provided with the rotationally-operable steering wheel 7A, the articulated construction vehicle is conveniently allowed under regulations to travel going or coming on general roadways. The operation of the steering wheel 7A is rotational operation, and therefore, the steering wheel 7A is extremely large in the amount of maximum operation. The steering-wheel-operated control device 6, therefore, makes it possible to easily perform fine operation which needs to be frequently performed during traveling on a general roadway, and also makes it possible to perform driving operation with the same maneuvering feeling as general cars. Accordingly, this articulated construction vehicle is suited for traveling on general roadways while retaining the excellent performance of the conventional articulated construction vehicles as they are.

In addition to the equipment of such excellent performance of the conventional technologies as they are, this articulated construction vehicle is also provided with the lever-operated, electrical control device 10 that is provided with the tilt-operable lever 10A and outputs an electrical signal by the tilt operation, and is designed to permit selective performance of operation by the lever-operated, electrical control device 10 as ON/OFF operation of the lever-operated, electrical control device 10. Different from the conventional technologies, the articulated construction vehicle is also suited for work at construction sites. Described specifically, the operation of the lever 10A in the lever-operated, electrical control device 10 is tilt operation that causes the lever 10A to tilt by bending or extending the wrist while holding the lever 10A with one hand. The amount of maximum operation is extremely small compared with that of operation of the steering wheel 7 in the steering-wheel-operated control device 6. Even if it becomes necessary during work at a construction site to frequently perform large operation the amount of which is large, the operation-related load applied to an operator is far smaller compared with that applied by operation of the steering wheel 7A.

The lever 10A in the lever-operated, electrical control device 10 is suited for operation by holding it with one hand. When traveling is performed at a construction site while performing work there as in the case of performing digging work by a wheel loader, a control means for one or more hydraulic actuators relating to the work can, therefore, be easily operated with one hand while operating the lever-operated, electrical control device 10 with the other hand. At this time, the operation of the body-articulating hydraulic cylinders 2 is performed under control by the lever as in the operation commonly performed in the operation of the one or more hydraulic actuators for the work. Therefore, the operation of both the hydraulic actuators can be performed by operation means of the same kind, and hence, can be performed with ease. The operation by the lever 10 is operation by the electrical lever, which can reduce operating force at the time of operation. The operation by the operator at the time of work can, therefore, be facilitated further.

As is readily appreciated from the above description, this articulated construction vehicle can perform steering control, which is not only suited for traveling on general roadways but also suited for work at construction sites. As a consequence, the articulated construction vehicle can reduce an operational load on its operator to decrease the operator's fatigue compared with the conventional articulated construction vehicles upon performing steering control of the construction vehicle.

DRAWING LEGEND

1 Self-propelled body
1A Front frame
1B Rear frame
1C Pin
2 Body-articulating hydraulic cylinder
3 Hydraulic pump
4 Pilot pump
5 Pilot-operated directional control valve
6 Steering-wheel-operated control device
7 Rotary directional control valve
7A Steering wheel
7B Rotary spool
7c Valve main body
7D Springs
8 Gear pump gear pump
Oil reservoir
10 Lever-operated, electrical control device
10A Lever
11 Controller
12 Lever-type electrical change-over switch
13 Pressure sensors
14 Signal conversion means
14A,14B Pressure-proportional solenoid valves
15A,15B Solenoid-operated selector valves
a,b Pressure-oil feed and drain lines
c,d Pilot lines

The invention claimed is:

1. An articulated construction vehicle provided with a self-propelled body with a front frame and a rear frame connected together rotatably relative to one another in a horizontal direction such that said self-propelled body can be articulated, body-articulating hydraulic cylinders selectively extendable or retractable such that said front frame can be driven to rotate relative to said rear frame in the horizontal direction to articulate said self-propelled body, a pilot-operated directional control valve for controlling a direction and amount of pressure oil to be fed to each of said body-articulating hydraulic cylinders, and a steering-wheel-operated control device provided with a rotationally-operable steering wheel such that by a rotational operation of said steering wheel, a pilot signal can be outputted to corresponding one of signal-receiving ports of said pilot-operated directional control valve to switch an operated position and opening area of said pilot-operated directional control valve, characterized in that said articulated construction vehicle is constructed by being provided with a lever-operated, electrical control device provided with a tilt-operable lever to output an electrical signal by tilt-operation of said lever, a controller for being inputted with the electrical signal from said lever-operated, electrical control device to output an electrical signal concerning a direction and amount of the operation of said lever, a signal conversion means for converting the electrical signal from said controller into a corresponding pilot signal and outputting the pilot signal to corresponding one of said signal-receiving ports of said pilot-operated directional control valve, and a selection means of an operation system that operation of said pilot-operated directional control valve by the rotational operation of said steering wheel in said steering-wheel-operated control device and operation of said pilot-operated directional control valve by the tilt-operation of said lever in said lever-operated, electrical control device can be selectively performed, wherein pressure sensors for detecting existence or non-existence of a pilot signal outputted from said steering-wheel-operated control device are arranged to feed detection results from said pressure sensors to said controller, and, when said controller determines, based on the detection results, that the pilot signal has been outputted from said steering-wheel-operated control device, control is performed to disable operation of said pilot-operated directional control valve by a tilt operation of said lever of said lever-operated, electrical control device.

2. An articulated construction vehicle according to claim 1, wherein said steering-wheel-operated control device is constructed by arranging a rotary directional control valve having a valve main body with a snug-fit bore formed therein and a rotary spool rotatably fitted in said snug-fit bore of said valve main body for rotation by rotational operation of said steering wheel, and a gear pump rotatable in association with rotation of said rotary spool; and is constructed such that pilot oil in a predetermined volume corresponding to an amount of rotation of said rotary spool is guided as a pilot signal to corresponding one of said signal-receiving ports of said pilot-operated directional control valve.

3. An articulated construction vehicle according to claim 1, wherein said steering-wheel-operated control device is constructed by arranging a rotary directional control valve having a valve main body with a snug-fit bore formed therein and a rotary spool rotatably fitted in said snug-fit bore of said valve main body for rotation by rotational operation of said steering wheel, and a gear pump rotatable in association with rotation of said rotary spool; and is constructed such that pilot oil in a predetermined volume corresponding to an amount of rotation of said rotary spool is guided as a pilot signal to corresponding one of said signal-receiving ports of said pilot-operated directional control valve.

4. An articulated construction vehicle provided with a self-propelled body with a front frame and a rear frame connected together rotatably relative to one another in a horizontal direction such that said self-propelled body can be articulated, body-articulating hydraulic cylinders selectively extendable or retractable such that said front frame can be driven to rotate relative to said rear frame in the horizontal direction to articulate said self-propelled body, a hydraulic pump for producing pressure oil to drive said body-articulating hydraulic cylinders, a pilot-operated directional control valve arranged on a delivery side of said hydraulic pump to control a direction and amount of the pressure oil to be fed to each of said body-articulating hydraulic cylinders, a pilot pump arranged in a system different from a flow line for the pressure oil from said hydraulic pump to produce a pilot pressure for switching said pilot-operated directional control valve, and a steering-wheel-operated control device having a rotary directional control valve arranged on a delivery side of said pilot pump and provided with a steering wheel rotationally operable to operate said body-articulating hydraulic cylinders, said steering-wheel-operated control device being capable of acting, upon rotational operation thereof, to guide pilot oil in an amount corresponding to an amount of the operation of said steering wheel from said pilot pump to one of paired signal-receiving ports of a pilot-operated directional pump such that an operated position and opening area of said pilot-operated directional control valve can be switched in accordance with a direction and the amount of the operation of said steering wheel, respectively, and during non-operation of said steering wheel, to cut off a flow of the pilot oil guided to said paired signal-receiving ports of said pilot-operated directional control valve, characterized in that said articulated construction vehicle is constructed by being provided with a lever-operated, electrical control device arranged in a system different from said steering-wheel-operated control device and provided with a tilt-operable lever to output an electrical signal by tilt-operation of said lever, a controller for being inputted with the electrical signal from said lever-operated, electrical control device to output an electrical signal concerning a direction and amount of the operation of said lever, a pair of pressure-proportional solenoid valves for being switched by an electrical signal from said controller to guide pilot oil in an amount corresponding to the electrical signal to one of said paired signal-receiving ports of said pilot-operated directional control valve and also to communicate the other signal-receiving port to a side of an oil reservoir such that the operated position and opening area of said pilot-operated directional control valve can be switched, a pair of solenoid-operated selector valves switchable by an electrical signal to open one of a pilot line, which is to communicate said paired pressure-proportional solenoid valves to said respective signal-receiving ports of said pilot-operated directional control valve, and another pilot line, which is to communicate said steering-wheel-operated control device to said respective signal-receiving ports of said pilot-operated directional control valve, and to close the other pilot line, and a lever-type electrical change-over switch for switching the pair of solenoid-operated selector valves by an electrical signal such that said pilot line, which is to communicate said pair of pressure-proportional solenoid valves to said respective signal-receiving ports of said pilot-operated directional control valve, is opened to bring said lever-operated, electrical control device into an usable state.

* * * * *